United States Patent [19]

Miura et al.

[11] 3,825,058

[45] July 23, 1974

[54] MOLD PREPARED BY VACUUM SEALED MOLDING PROCESS

[75] Inventors: Takashi Miura; Tadashi Sugiura, both of Toyokawa; Yoshizi Iyoda, Toyohashi, all of Japan

[73] Assignee: Sintokogio, Ltd., Nagoya, Japan

[22] Filed: Apr. 9, 1973

[21] Appl. No.: 349,471

[30] Foreign Application Priority Data
Apr. 15, 1972  Japan .............................. 47-38068
Dec. 25, 1972  Japan .......................... 47-2687[U]

[52] U.S. Cl. ...................... 164/253, 164/7, 164/65, 164/349
[51] Int. Cl. ......................................... B22d 27/16
[58] Field of Search .............. 164/7, 15, 29, 61, 65, 164/253, 349

[56] References Cited
UNITED STATES PATENTS
2,434,780   1/1948   Wiss et al. ............................ 164/61
2,877,523   3/1959   Turnbull ............................... 164/65
2,915,797   12/1959  Hoehl .................................. 164/61

FOREIGN PATENTS OR APPLICATIONS
1,239,814   7/1960   France ................................ 164/349

*Primary Examiner*—J. Spencer Overholser
*Assistant Examiner*—John E. Roethel
*Attorney, Agent, or Firm*—Armstrong, Niakaido and Wegner

[57] ABSTRACT

A mold prepared by a vacuum sealed molding process in which, in order to prevent breakdown of the mold during pouring of a molten metal, a tubular member forming a passage serving as a communication means between the mold cavity and the atmosphere is connected to the uppermost portion of a shield member defining the cavity so that the atmospheric pressure can be imparted to the cavity even when the molten metal is being poured into the cavity.

4 Claims, 5 Drawing Figures

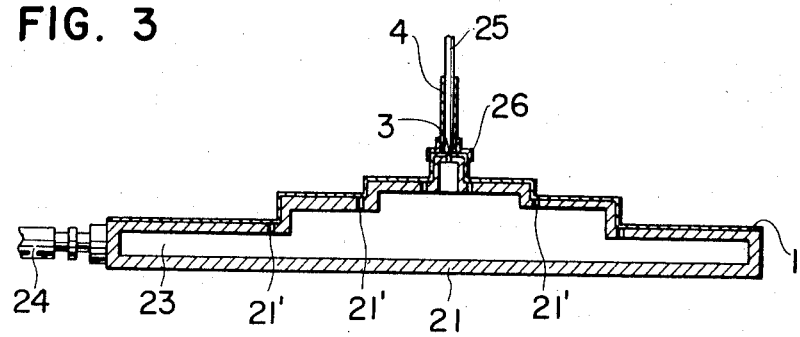
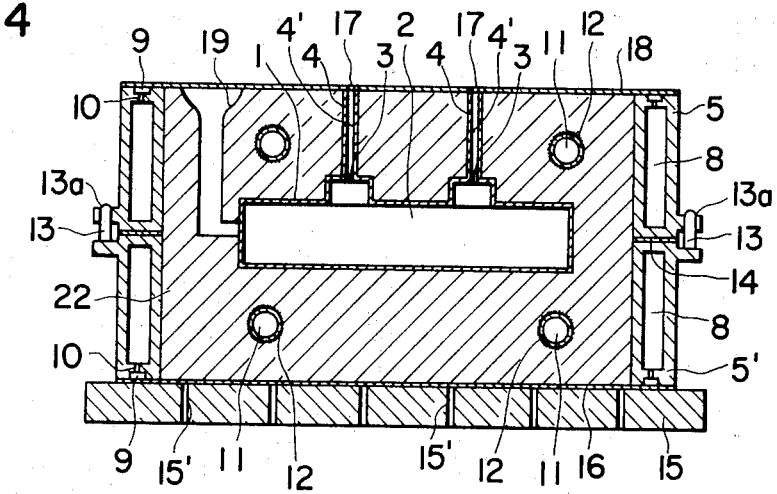
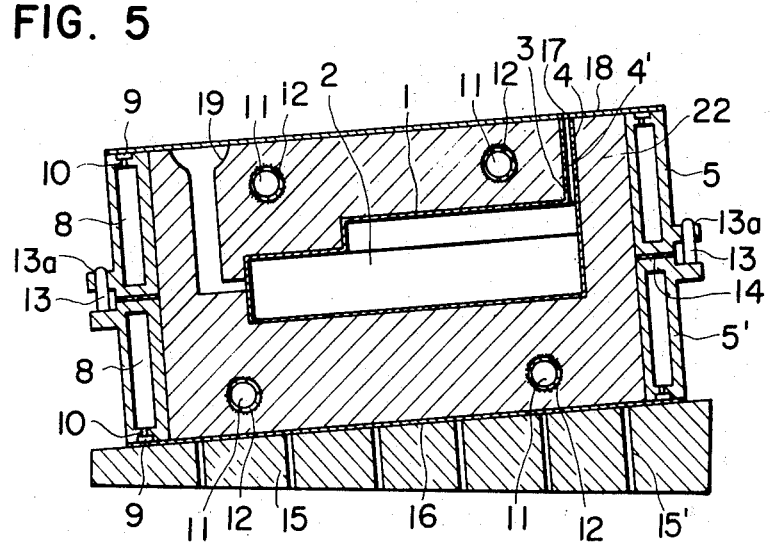

3,825,058

MOLD PREPARED BY VACUUM SEALED MOLDING PROCESS

BACKGROUND OF THE INVENTION

1. Field of the Invention

This invention relates to a mold prepared by a vacuum sealed molding process.

2. Description of the Prior Art

A vacuum sealed molding process has been developed recently in Japan. This vacuum sealed molding process comprises application of vacuum suction to dry sand or like heat-resisting particulate material thereby compacting the particulate material within a molding flask for preparing a mold and is featured by the fact that the surfaces of the mold cavity are covered with a gasimpermeable shield member such as a plastic film, plastic sheet or metal foil in order to ensure satisfactory application of the vacuum suction to the particulate material forming the mold. The casting product obtained by pouring a molten metal into the mold cavity can be easily taken out of the mold by merely releasing the application of the vacuum suction to the mold due to the fact that the mold according to the vacuum sealed molding process can be prepared by merely compacting the heatresisting particulate material by the vacuum suction. Further, the particulate material used for preparing one mold can be removed and then immediately be utilized for the preparation of another mold without applying any treatment thereon due to the fact that any additives such as water and binders are not included in the particulate material. Therefore, the vacuum sealed molding process is advantageous among others in that the sand mixing apparatus which has inevitably been required in foundries became unnecessary.

However, when a molten metal is poured into the mold prepared by the vacuum sealed molding process, the shield member covering the surfaces of the cavity is successively fused away by the heat of the molten metal resulting in communication between the casting cavity and the spaces between the particles of the particulate material. Therefore, if the communication between a portion of the casting cavity and the atmosphere were interrupted by the molten metal poured into the cavity, pressure difference between the casting cavity and the spaces between the particles of the particulate material might be undesirably reduced. As a result, suction force supporting the weight of the molded particulate material is reduced thereby resulting mold defects such as dropoff or deformation. This would lead to difficulty in obtaining desired castings.

SUMMARY OF THE INVENTION

The present invention provides an improved mold which is free from the drawback above described. In one form of the present invention, a relatively hard shield member in the form of a synthetic resin sheet or metal foil is preformed to have the same shape as that of the surfaces of the casting cavity and a tubular member of similar material defining an air passage communicating with the atmosphere is formed integrally with the preformed shield member at the uppermost portion of the preformed shield member.

In another form of the present invention, the surfaces of the casting cavity are formed by a flexible sheet or film of synthetic resin material and a tubular member of similar material defining the air passage communicating with the atmosphere is connected to the uppermost portion of the synthetic resin sheet or film in preparing a mold by the vacuum sealed molding process.

It is an object of the present invention to provide a mold of the kind above described which is free from undesirable mold breakdown that may occur during pouring of a molten metal.

Another object of the present invention is to provide a mold of the kind above described which can prevent pouring of any excessive molten metal during casting operation.

BRIEF DESCRIPTION OF THE DRAWINGS

FIG. 3 is a schematic sectional view of one form of a pattern preferably used in the embodiment shown in FIG. 2 for forming the shield member into the desired shape.

FIGS. 4 and 5 are schematic sectional views of other embodiments of the present invention.

DESCRIPTION OF THE PREFERRED EMBODIMENTS

Figure 1:
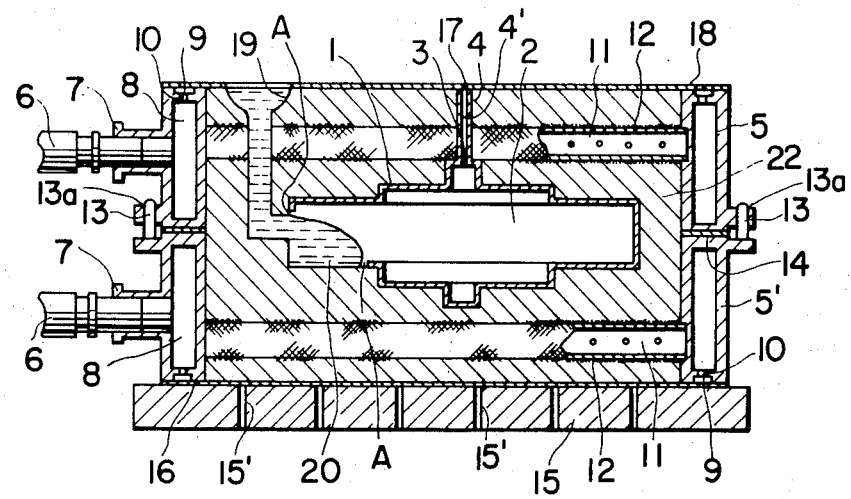
FIG. 1 is a schematic sectional view of the mold of an embodiment of the present invention employing a relatively hard preformed shield member and shows the state in which a molten metal is partly poured into the mold.

Referring to FIG. 1, an improved mold embodying the present invention includes a relatively hard, preformed shield member 1 defining a casting cavity 2 for forming a product of desired shape. This shield member 1 is in the form of a film or sheet of thermoplastic resin or thermo-setting resin or a foil of a metal having a low melting point so that it is easily fused away by the heat of a molten metal. A communication part 3 is provided at the uppermost portion of the cavity 2 defined within the shield member 1, and a tubular shield member 4 of similar material is connected to the communication port 3 to constitute an air passage 4 communicating with the atmosphere.

An upper molding flask 5 and a lower molding flask 5' have an upper and a lower end opening. These upper and lower flasks 5 and 5' are double-walled at the side walls thereof so as to define a vacuum chamber 8 therein. The vacuum chambers 8 of the upper and lower flasks 5 and 5' are connected to a vacuum pump (not shown) through vacuum suction conduits 6 and pipe joints 7. A continuous vacuum suction groove 9 is provided on the upper or lower end surface of the side walls of each of the upper and lower flasks 5 and 5', and a multiplicity of perforations 10 are bored in the upper or lower wall portions of each vacuum chamber 8 for communication with the vacuum suction groove 9. These vacuum suction grooves 9 act to apply vacuum suction to thin sheets 18 and 16 of plastic material covering the upper and lower end openings of the upper and lower flasks 5 and 5', respectively.

A plurality of tubes 11 having many perforations are disposed in the interior of the upper and lower flasks 5 and 5' so as to communicate with the vacuum chambers 8, and the surface of each perforated tube 11 is covered with a finely meshed member 12 such as a wire gauze. A sealing packing 14 is interposed between the mating faces of the upper and lower flasks 5 and 5', and correct positioning of the upper and lower flasks 5 and 5' relative to each other are ensured by pin receiving holes 13a bored in the flange portions of the upper flask 5 and guide pins 13 upstanding from the flange portions of the lower flask 5'.

In the embodiment shown in FIG. 1, the shield member 1 and the tubular shield member 4 providing the air passage 4' are preformed integrally from a relatively hard material by means such as blow molding. Referring to FIG. 1 in which such preformed integral shield means is employed, a flexible thin sheet 16 of plastic material is placed on a board 15 which is provided with a plurality of ports 15' communicating with the atmosphere for imparting the atmospheric pressure to the thin sheet 16. The lower flask 5' is then mounted on the board 15 and a suitable amount of a heat-resisting particulate material 22 similar to dry sand is charged into the lower flask 5' while lightly imparting vibrations thereto. The shield member 1 which is preformed integrally with the tubular shield member 4 defining the air passage 4' is then set on the mass of the particulate material 22 charged into the lower flask 5'. The upper flask 5 is then mounted on the lower flask 5' in accurately registered relation by fitting the guide pins 13 into the pin receiving holes 13a.

A sprue 19 which is preferably in the form of a lost pattern of, for example, foamed styrene is then connected to a predetermined position of the preformed shield member 1. After charging further the particulate material 22 into the shape in the jointed upper and lower flasks 5 and 5', a thin sheet 18 of plastic material is used to cover the upper end opening of the upper flask 5 and a small hole 17 is bored in the thin sheet 18 at a position aligned with the upper end opening of the air passage 4'. Then, when a suitable valve (not shown) connected to the vacuum suction conduits 6 is opened to establish a vacuum in the vacuum chambers 8 of the upper and lower flasks 5 and 5', the spaces between the particles of the particulate material 22 within the upper and lower flasks 5 and 5' are evacuated through the finely meshed members 12 and perforated tubes 11 so that a mold can be formed by the mass of the particulate material 22.

Then, when a molten metal 20 is poured through the sprue 19 into the cavity 2 of the mold formed in the manner above described, the shield member 1 is fused and partially gasified by the heat of the molten metal 20 and successive portions of the shield member 1 disappear gradually. In this case, due to the gradual disappearance of the successive portions of the shield member 1, the spaces between the particles of the particulate material 22 may prematurely communicate with the cavity 2 through a fused area A, and as a result, air in the cavity 2 may be drawn out into the vacuum suction conduits 6 through this communication area A and through the spaces between the particles of the particulate material 22. However, due to the fact that this communication area A is sealed successively by the molten metal 20 advancing in the cavity 2 instead of the fused shield member, thereby it is not so enlarged and the uppermost portion of the cavity 2 communicates with the atmosphere through the air passage 4', a corresponding quantity of atmospheric air is introduced into the cavity 2 to compensate for the loss of air from the cavity 2 thereby continuously maintaining an internal pressure within the cavity 2 substantially equal to the atmospheric pressure. Therefore, the pressure within the cavity 2 can be maintained substantially constant, thus undesirable breakdown of the mold can be prevented.

The shield member 1 may be formed from a flexible thin sheet of plastic material instead of a relatively hard material as described with reference to FIG. 1.

Figure 2:
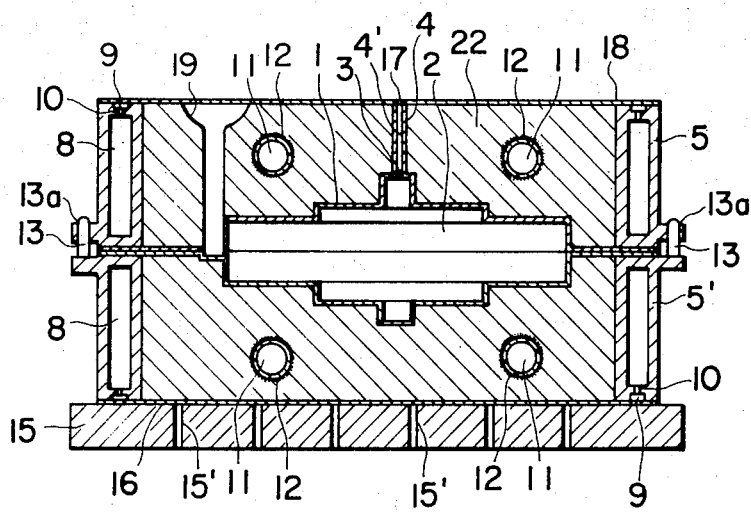
FIG. 2 is a schematic sectional view of another embodiment of the present invention employing a flexible shield member.

Referring to FIG. 3, a shield member 1 which may be a flexible plastic film or sheet is mounted on a pattern 21 having many perforations 21', and a vacuum chamber 23 formed in the pattern 21 is evacuated through a vacuum suction conduit 24 connected to a vacuum pump (not shown) so as to apply vacuum suction for bringing the shield member 1 into intimate contact with the upper surface of the pattern 21. A communication port 3 is then bored in the shield member 1 at a position corresponding to the uppermost portion of the pattern 21. A rod 25 having a thin plastic film or sheet forming shield member 4 wound therearound is erected on the communication port 3, and the joint portion between the shield members 1 and 4 is hermetically sealed with tape 26. Then, as shown in FIG. 2, a sprue 19 in the form of a lost pattern is connected to a predetermined position of the shield member 1, and after mounting an upper molding flask 5 on the pattern 21, a particulate material 22 is charged into the upper flask 5 from above. A thin sheet 18 of plastic material having a perforation 17 is used to cover the upper end opening of the upper flask 5. In this case, the thin sheet 18 is placed so that the perforation 17 registers with the upper end of the rod 25. A vacuum chamber 8 in the upper flask 5 is then evacuated by a vacuum pump (not shown) for removing air from the spaces between the particles of the particulate material 22 filled in the upper flask 5, and the rod 25 is then withdrawn through the perforation 17 of the sheet 18. In spite of the withdrawal of the rod 25, the shield member 4 wound around the rod 25 remains as it stood retaining its tubular form owing to the vacuum suction applied through the particulate material 22, thereby providing a air passage 4'.

The vacuum suction applied to the pattern 21 is then released for causing the shield member 1 to be drawn onto the surface of the block of the particulate material 22, and the pattern 21 is then withdrawn from the upper flask 5 thereby completing the molding of an upper mold portion. Subsequently, a lower mold portion which is not provided with the sprue 19 and air passage 4' is molded in a manner similar to the molding process for the upper mold portion, and the upper mold portion is mounted on the lower mold portion to obtain a complete mold as shown in FIG. 2. The operation including pouring of a molten metal into this mold for obtaining a casting is the same as that described with reference to FIG. 1.

A preformed shield member which is split into an upper half and a lower half is preferably employed for preparing a mold of complex shape having a plurality of deep concavities and raised convexities since, in such a case, it is difficult to bring a shield member 1 like that employed in the preceding embodiment into intimate contact with a pattern 21. This difficulty is overcome by preforming an upper shield member 1 and a lower shield member 1 into each desired shape from thermoplastic resin and using these shield members 1 in conjunction with a pattern 21 for preparing a mold in a manner similar to the manner of molding in which a single flexible shield member 1 is employed as shown in FIG. 2.

FIG. 4 shows a modification in which the cavity 2 includes a plurality of upper projected portions. In this case, it is preferable that the air passage 4' be provided at each of the projected portions of the cavity 2 so that the communication between the cavity 2 and the atmosphere may not be interrupted.

FIG. 5 shows another modification in which the cavity 2 includes a flat planar uppermost portion. In this case, it is preferable that the mold be slightly inclined with respect to the horizontal so that the shield member 1 may not be fused away over an excessively wide area by being attacked by the heat of a molten metal.

Figure 6:
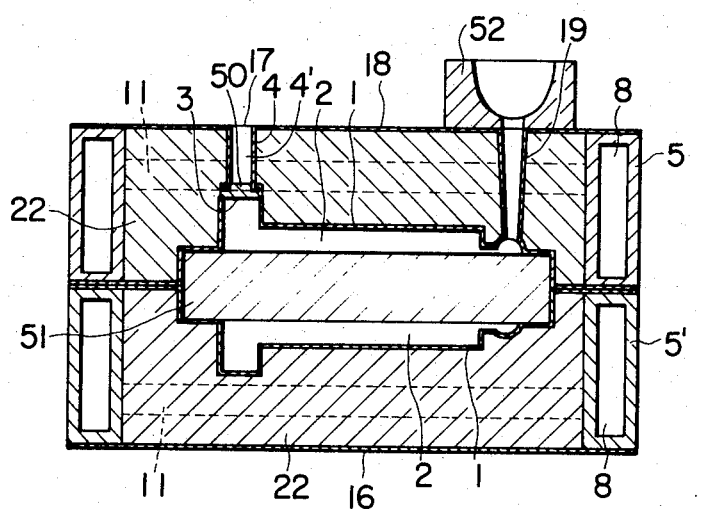
FIG. 6 is a schematic sectional view of another embodiment of the present invention employing an air passage means provided with a heat-resisting gaspermeable member at the lower end thereof.
Figure 7:
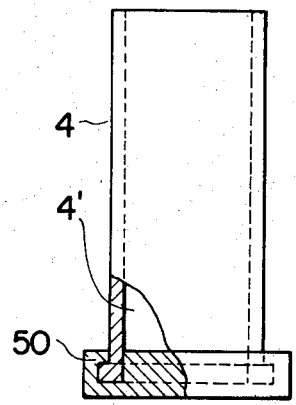
FIG. 7 is an enlarged partly sectional elevation of the air passage means shown in FIG. 6.

Referring to FIGS. 6 and 7 showing another embodiment of the present invention, a shield member 1 which may be a flexible plastic film or sheet is placed on a pattern 21 having many perforations 21' similar to that shown in FIG. 3 and vacuum suction is applied to a vacuum chamber 23 in the pattern 21 through a suction conduit 24 connected to a vacuum pump (not shown) for bringing the shield member 1 into intimate contact with the surface of the pattern 21. A communication port 3 is then bored in the shield member 1 at a position corresponding to the uppermost portion of the pattern 21. A tubular shield member 4 of metal material having an air-permeable heat-resisting disc 50 fixed to the lower end thereof is erected on the communication port 3. This heat-resisting disc 50 may be made by bonding the particles of a heat-resisting particulate material such as silica sand with a binder such as sodium silicate. Although the heat-resisting disc 50 is shown unitarily combined with the shield member 4 in FIG. 7, the heat-resisting disc 50 may be initially disposed on the communication port 3 separately from the shield member 4 and then the shield member 4 may be erected on the heat-resisting disc 4. The heat-resisting disc 50 is preferably sealed gas-tight at the outer periphery thereof by applying a suitable sealing means such as plastic tape or by applying a mold coating material.

After erecting a sprue 19 in the form of a lost pattern at a predetermined position relative to the shield member 1, an upper molding flask 5 is mounted on the pattern 21 and a particulate material 22 is charged into the upper flask 5 from above. A thin sheet 18 of plastic material having a perforation 17 is then placed on the upper surface of the upper flask 5 to cover the upper end opening of the flask 5. In this case, the thin sheet 18 is placed so that the perforation 17 registers with the upper end opening of the shield member 4 defining a air passge 4' therein. A vacuum chamber 8 in the upper flask 5 is then evacuated by a vacuum pump (not shown) for removing air from the spaces between the particles of the particulate material 22 filled in the upper flask 5, and the vacuum suction applied to the pattern 21 is subsequently released for causing the shield member 1 to be drawn onto the surface of the block of the particulate material 22. Subsequently, the pattern 21 is withdrawn from the upper flask 5 thereby completing the molding of an upper mold portion. Then, a lower mold portion which is not provided with the sprue 19 and air passage 4' is molded in a manner similar to the molding process for the upper mold portion, and the upper mold portion is mounted on the lower mold portion to obtain a complete mold as shown in FIG. 6. The embodiment shown in FIG. 6 includes a core 51 and a sprue cup 52.

The operation including pouring of a molten metal into the mold thus obtained for producing a casting is the same as that described with reference to FIGS. 1 and 2. After the molten metal fills entirely the cavity 2, it tends to rise through the air passage 4'. However, the molten metal cannot rise beyond the uppermost position of the cavity 2 by being intercepted by the heat-resisting disc 50. Therefore, a casting without any wasteful portions can be reliably obtained and excessive use of the molten metal can be prevented.

We claim:

1. A mold prepared by a vacuum sealed molding process having a casting cavity defined by a shield member of synthetic resin material or metal foil and a heat-resisting particulate material packed surrounding said cavity tightly and applied vacuum suction to the spaces between the particles of a heat-resisting particulate material so that, said shield member is successively fused away and partially gasified by the heat of a molten metal poured into said cavity, then can be removed through said spaces by the vacuum suction, characterized in that said mold comprising air passage means which is connected to the uppermost portion of said cavity to permit communication between the said cavity and the atmosphere and whose peripheral wall is formed from a gas-impermeable material for ensuring the application of the vacuum suction to said spaces between the particles of said particulate material, whereby the atmospheric pressure can be imparted to said particulate material through said shield member defining said cavity above the mass of the molten metal being poured into said cavity so as to maintain the shape of the mold.

2. A mold as claimed in claim 1, wherein a gas-permeable and heat-resisting member is disposed at the lower end of said air passage means and said cavity so that the molten metal being poured into said cavity may not intrude into said air passage means.

3. A mold as claimed in claim 1, wherein said cavity includes a plurality of upper projected portions and said passage means are provided at each of the uppermost portions of the projected portions.

4. A mold as claimed in claim 1, wherein said cavity includes a flat planar uppermost portion and said passage means are provided at the edge of the flat planar uppermost portion whereby, when said mold is inclined with respect to the horizontal, said edge will be uppermost in the cavity.

* * * * *